(12) United States Patent
Park

(10) Patent No.: US 11,774,120 B2
(45) Date of Patent: Oct. 3, 2023

(54) FILTER STRUCTURE CAPABLE OF REMOVING DUST

(71) Applicant: CENDORI CO., LTD, Gwangju (KR)

(72) Inventor: Moon Soo Park, Gwangju (KR)

(73) Assignee: CENDORI CO., LTD, Gwangju (KR)

( * ) Notice: Subject to any disclaimer, the term of this patent is extended or adjusted under 35 U.S.C. 154(b) by 618 days.

(21) Appl. No.: 16/960,279

(22) PCT Filed: Jan. 11, 2019

(86) PCT No.: PCT/KR2019/000430
§ 371 (c)(1),
(2) Date: Jul. 6, 2020

(87) PCT Pub. No.: WO2019/139391
PCT Pub. Date: Jul. 18, 2019

(65) Prior Publication Data
US 2021/0071904 A1 Mar. 11, 2021

(30) Foreign Application Priority Data
Jan. 11, 2018 (KR) .......... 10-2018-0003718

(51) Int. Cl.
| | |
|---|---|
| *B01D 46/48* | (2006.01) |
| *B01D 46/681* | (2022.01) |
| *F24F 8/10* | (2021.01) |
| *F24F 8/90* | (2021.01) |
| *F24F 8/108* | (2021.01) |
| *F24F 13/28* | (2006.01) |

(52) U.S. Cl.
CPC .......... *F24F 8/108* (2021.01); *B01D 46/681* (2022.01); *F24F 8/10* (2021.01); *F24F 8/90* (2021.01); *F24F 13/28* (2013.01); *B01D 46/48* (2013.01); *F24F 2221/225* (2013.01)

(58) Field of Classification Search
CPC ...... B01D 46/10; B01D 46/48; B01D 46/681; F24F 8/10; F24F 8/90; F24F 8/108
USPC ................................. 55/289, 385.3
See application file for complete search history.

(56) References Cited

U.S. PATENT DOCUMENTS

| | | | | |
|---|---|---|---|---|
| 4,233,040 A | * | 11/1980 | Vogelaar ............... | B01D 46/26 55/467 |
| 4,439,218 A | * | 3/1984 | Priepke ................. | B01D 46/10 55/288 |

(Continued)

FOREIGN PATENT DOCUMENTS

| | | |
|---|---|---|
| CN | 2703983 Y | 6/2005 |
| CN | 202478754 U | 10/2012 |

(Continued)

*Primary Examiner* — Minh Chau T Pham
(74) *Attorney, Agent, or Firm* — NKL LAW; Jae Youn Kim

(57) ABSTRACT

A filter structure capable of removing dust is proposed. The filter structure includes a circular rim part; a frame, extending from the rim part, for installing a motor; a dust collection net attached to the frame; a brush which is in close contact with the dust collection net and is rotated by the motor; an opening, formed at a lower end of the rim part, for discharging dust; an open part formed at one side of the dust collection net; and a concave groove part having an outside coupled to the open part and in one-side communication with the opening at the rim part.

2 Claims, 5 Drawing Sheets

(56) References Cited

U.S. PATENT DOCUMENTS

| | | | | |
|---|---|---|---|---|
| 6,248,145 B1 * | 6/2001 | Radke | ................... | B01D 46/70 |
| | | | | 55/297 |
| 6,432,152 B2 * | 8/2002 | Frerich | ................... | F01P 11/12 |
| | | | | 55/467 |
| 8,097,050 B2 * | 1/2012 | Johnson | ............... | B01D 46/682 |
| | | | | 460/98 |
| 8,876,927 B2 * | 11/2014 | Hollatz | ................. | B60K 11/04 |
| | | | | 460/98 |
| 10,995,772 B2 * | 5/2021 | Clifford | ............... | F04D 29/703 |
| 2004/0003578 A1 * | 1/2004 | Twiefel | ............... | B01D 46/681 |
| | | | | 55/385.3 |

FOREIGN PATENT DOCUMENTS

| | | |
|---|---|---|
| JP | 2007-038215 A | 2/2007 |
| KR | 10-0343036 B1 | 7/2002 |
| KR | 10-2009-0060601 A | 6/2009 |
| KR | 10-2011-0122465 A | 11/2011 |
| KR | 10-1471074 B1 | 12/2014 |
| KR | 10-2015-0055326 A | 5/2015 |
| KR | 10-2017-0097466 A | 8/2017 |

* cited by examiner

FILTER STRUCTURE CAPABLE OF REMOVING DUST

TECHNICAL FIELD

The present invention relates to a filter capable of removing dust, and more particularly to a filter structure which effectively removes dust from a filter installed inside an external air inlet of an air conditioner.

BACKGROUND ART

In general, in buildings which are constructed recently, a lot of effort is being spent on insulation so as to achieve energy savings, and attention is also being paid to ventilation in the interest of health.

Therefore, in order to satisfy requirements for both insulation and ventilation, an air conditioner (or a ventilator) for buildings, which may forcibly suction and exhaust indoor air and external air through a ventilation fan and purify air and save energy using a filter or a heat exchanger, is used, and such an air conditioner for buildings is installed on the ceiling in many cases so as to effectively utilize a space, and suctions and exhausts indoor air and outdoor air through ducts. Of course, the air conditioner may have a cooling function (i.e., the function of a cold air blower) and a heating function (i.e., the function of a hot air blower).

As a conventional air conditioner having a dust collector, a total heat exchange-type ventilator, including an intake hole formed in one side surface of a case such that external air may be suctioned therethrough, a total heat exchanger having a unit provided therein to cool or heat the external air using a temperature difference between the external air suctioned through the intake hole and indoor air, an external air supply fan configured to supply the external air having passed through the total heat exchanger to an indoor space, an air supply hole through which the external air may be introduced into the indoor space by the air supply fan, an indoor air intake hole formed at the other side, i.e., the indoor side, of the case opposite the intake hole formed to suction the external air therethrough so as to exhaust the indoor air, an indoor air exhaust fan configured to exhaust the indoor air, exhausted from the intake hole, to the outside via the total heat exchanger, and an indoor air exhaust hole configured to exhaust the indoor air by the exhaust fan, has a structure including a pre-filter which is installed in the case of the total heat exchange-type ventilator and is formed as a fiber mat configured to collect substances having large particles, such as dust having large particles, so as to adsorb germs, bacteria, exhaust gas, dust, etc. from the external air suctioned into the indoor space, an ionizer configured to charge fine dust particles introduced through the pre-filter, a collector configured to collect the fine dust particles charged by the ionizer using the electrostatic phenomenon, and a deodorizing filter configured to deodorize air from which the fine dust particles have been removed by the collector.

However, the above-described conventional air conditioner has a structure in which the filter for removing only dust introduced into the heat exchanger is installed on the side surface of the heat exchanger, but does not have any unit to block the inflow of dust into the air conditioner or to shake off or remove dust collected in the air conditioner thereby, and thus, the inside of the air conditioner may be contaminated and consequently cause contamination of indoor air.

Particularly, a brush, which is in close contact with a dust collection net of the filter, is continuously rotated to sweep and drag dust, and thus it is not easy to discharge the dust and the filtering function of the filter is deteriorated.

RELATED ART DOCUMENT

1. Korean Patent Registration No. 10-1471074
2. Korean Patent Registration No. 10-0343036

DISCLOSURE

Technical Problem

Therefore, the present invention has been made in view of the above problems, and it is an object of the present invention to provide a filter structure in which a filter installed in an outdoor air inlet filters out dust entering the inside of an air conditioner, and an opening is formed at one side of a dust collection net of the filter so that dust swept by a brush, which is in close contact with the dust collection net and is rotated, is shaken off and discharged through the opening, and thereby, dust removal efficiency of the brush may be remarkably increased.

Technical Solution

In accordance with the present invention, the above and other objects can be accomplished by the provision of a filter structure capable of removing dust, including a circular rim part, frames configured to extend from the rim part so as to install a motor thereon, a dust collection net attached to the frames, a brush configured to be in close contact with the dust collection net and to be rotated by the motor, an opening formed at a lower end of the rim part so as to discharge dust therethrough, an open part formed at one side of the dust collection net, and a concave groove part having an outside coupled to the open part and one side communicating with the opening of the rim part.

An upper end of the concave groove part may be located under a motor shaft, and a lower end of the concave groove part may be located over the opening.

Advantageous Effects

The present invention has an effect in that a dust removal unit of the brush can be continuously shaken off by the concave groove part formed on one side surface of the dust collection net, and thus, dust can be efficiently removed without being dragged by the rotated brush.

Particularly, in the present invention, the dust introduced into an air conditioner can be blocked from an outdoor air inlet in advance so as to prevent the dust from entering the case of the air conditioner, thereby preventing deterioration of dust collection efficiency of the filter structure.

BEST MODE

Figure 1:
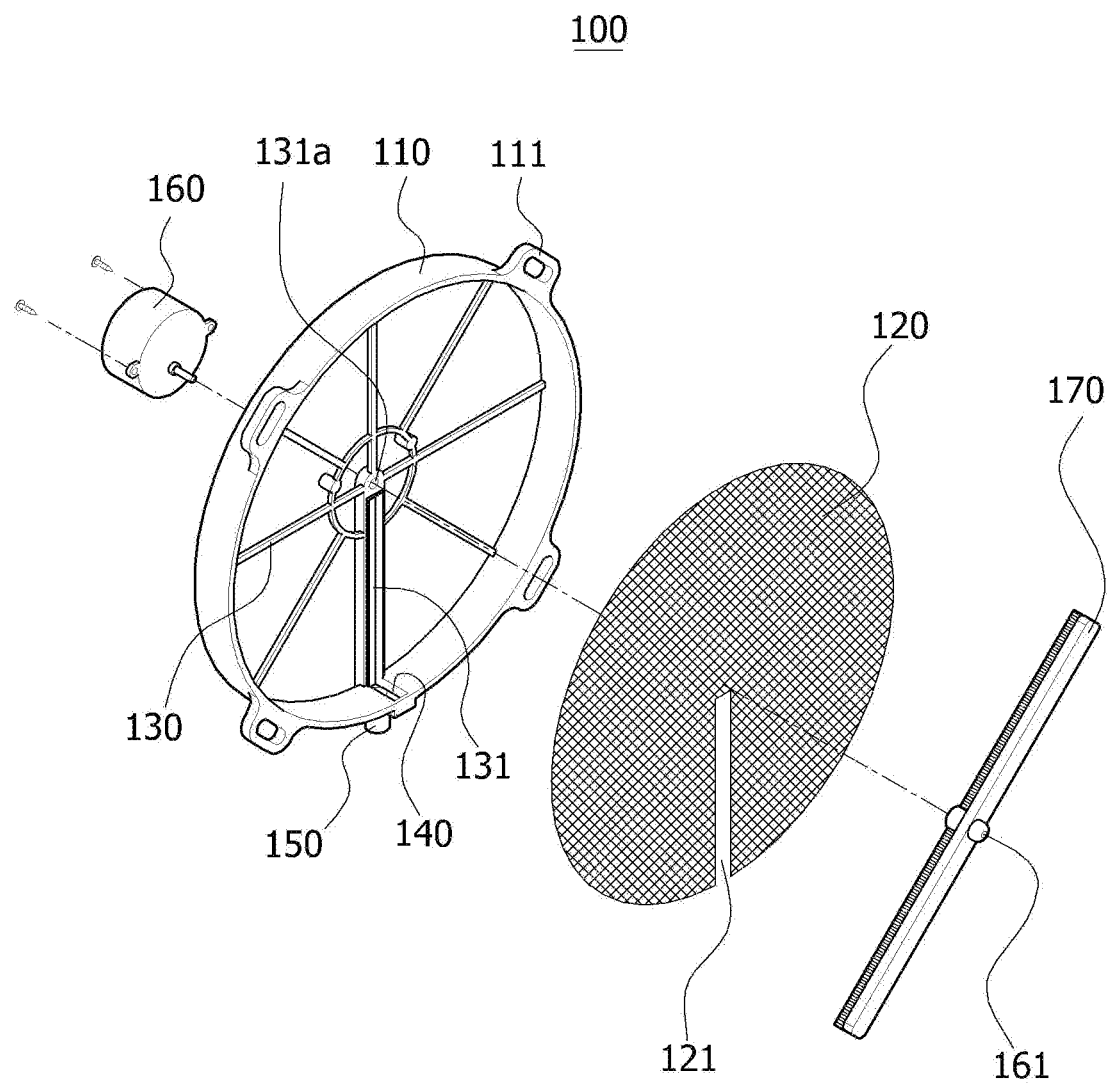
FIG. 1 is an exploded perspective view of a dust collector for air conditioners according to the present invention.

Hereinafter, reference will be made in detail to preferred embodiments of the present invention, examples of which are illustrated in the accompanying drawings. However, the disclosure of the invention is not limited to the embodiments set forth herein and may be variously modified. The terminology used herein is for the purpose of describing particular exemplary embodiments only and is not intended to limit the present invention. Further, as used herein, the singular forms may be intended to include the plural forms as well, unless the context clearly indicates otherwise. In the following description of the embodiments, terms, such as "comprising", are inclusive and therefore specify the presence of stated features, integers, steps, operations, elements, and/or components, but do not preclude the presence or addition of one or more other features, integers, steps, operations, elements, components, and/or groups thereof. All terms including technical terms and scientific terms used herein have the same meanings as those understood by those skilled in the art, unless stated otherwise. Terms defined in dictionaries which are usually used are to be interpreted as having meanings coinciding with relevant technical documents and the present disclosure, and are not to be interpreted as having ideal or formal meanings, unless defined otherwise.

The embodiment of the present invention, which will be described with reference to perspective views, specifically indicate the ideal embodiment of the invention. Consequently, various modifications to what is illustrated, for example, modifications of manufacturing methods and/or specifications, can be expected. Therefore, the embodiments are not limited to the specific forms in the regions shown, and, for example, may include modifications of forms due to manufacture. For example, a region illustrated or described as being even may have a rough or rough and nonlinear property. Further, a part illustrated as having a sharp angle may be rounded. Therefore, the regions shown in the drawings are merely approximate, and the forms thereof are not intended to illustrate the correct forms of the regions, and are not intended to limit the scope of the invention.

MODE FOR INVENTION

Hereinafter, an exemplary embodiment of a dust collector for air conditioners according to the present invention will be described in detail with reference to the accompanying drawings.

Figure 2:
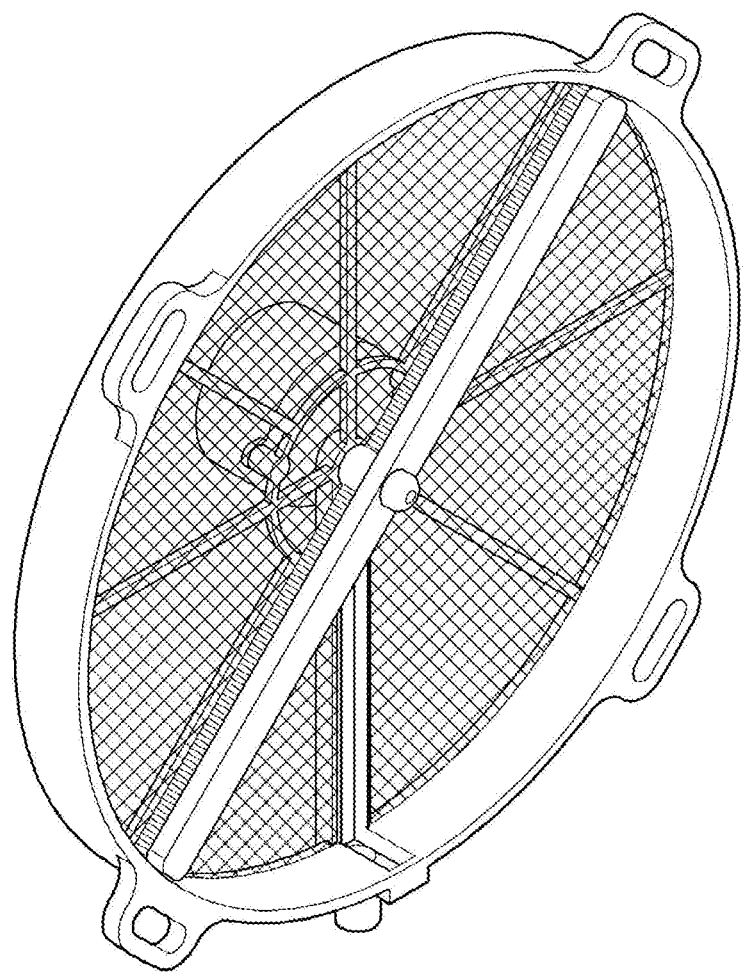
FIG. 2 is a perspective view illustrating the dust collector of FIG. 1 in an assembled state.
Figure 3:
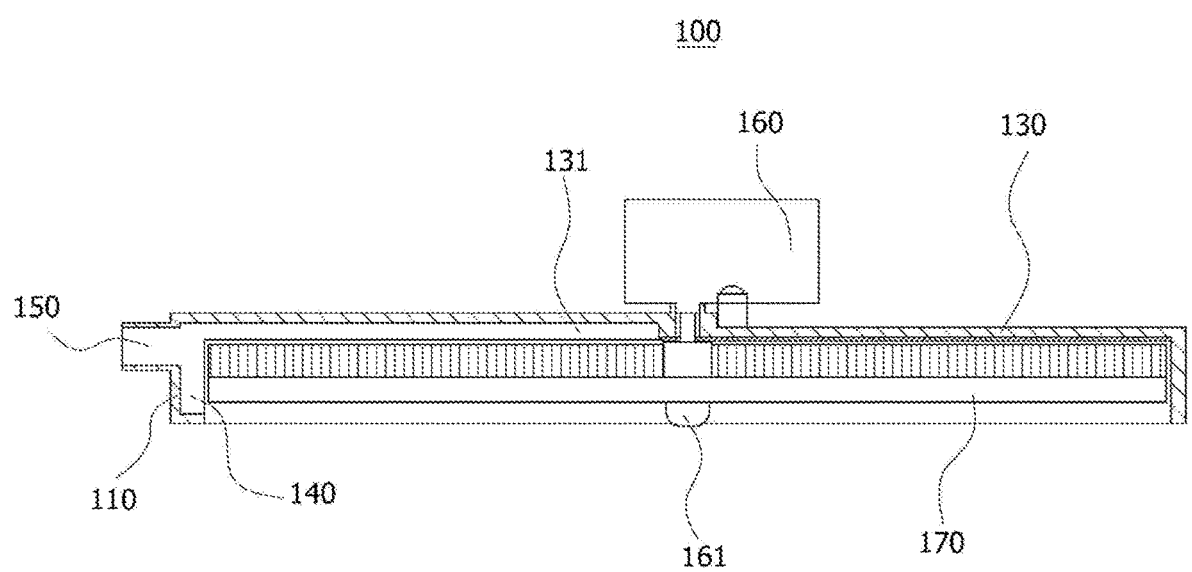
FIG. 3 is a cross-sectional view of FIG. 2.
Figure 4:
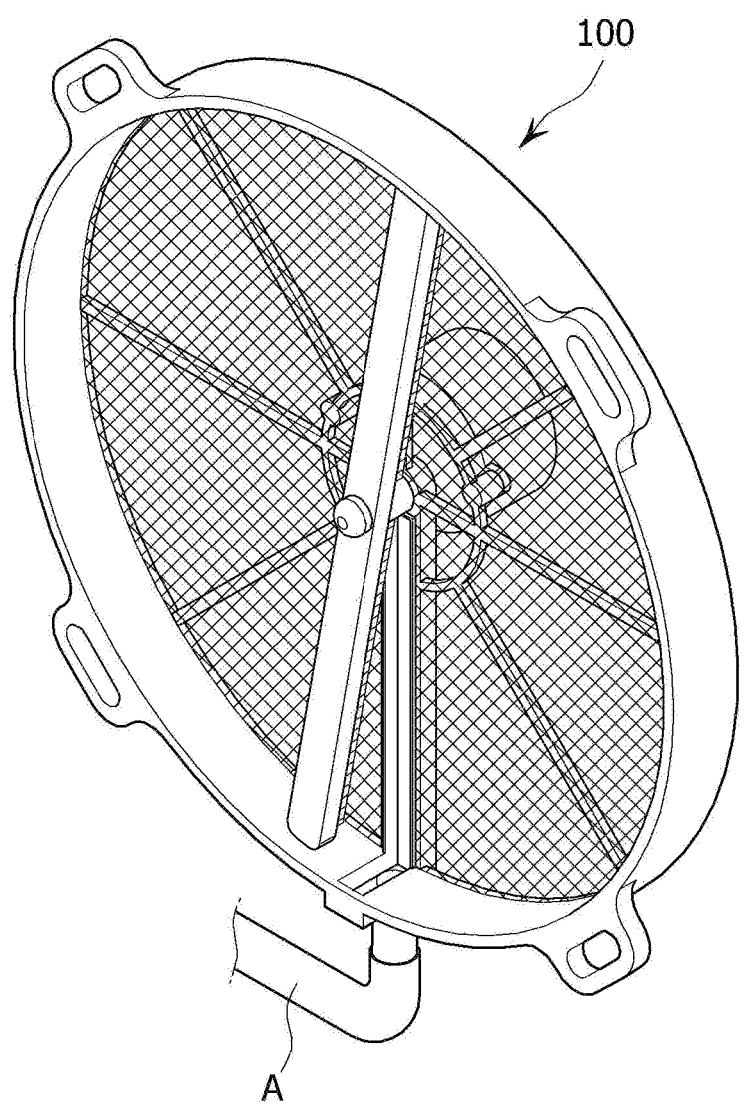
FIG. 4 is a reference view illustrating the usage state of the dust collector according to the present invention.
Figure 5:
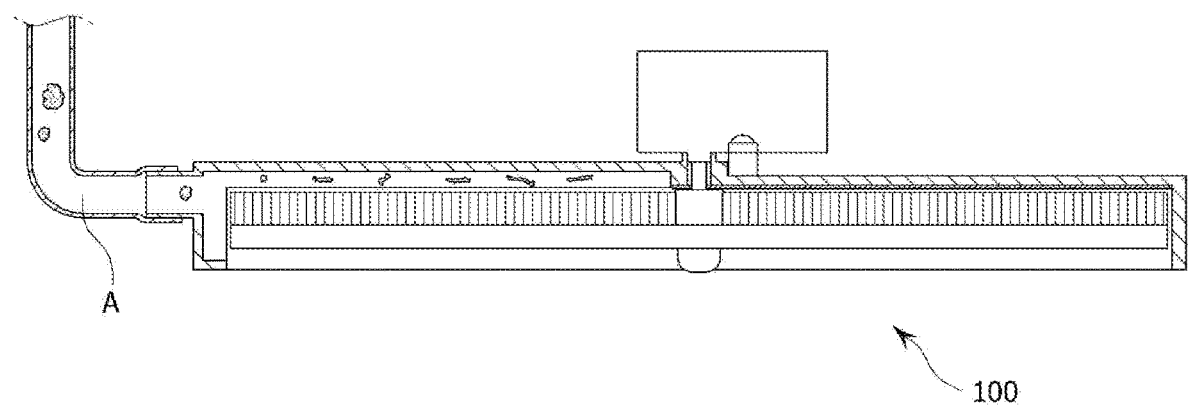
FIG. 5 is a cross-sectional view illustrating the usage state of the dust collector according to the present invention.

FIG. 1 is an exploded perspective view of the dust collector for air conditioners according to the present invention, FIG. 2 is a perspective view illustrating the dust collector of FIG. 1 in an assembled state, FIG. 3 is a cross-sectional view of FIG. 2, FIG. 4 is a reference view illustrating the usage state of the dust collector according to the present invention, and FIG. 5 is a cross-sectional view illustrating the usage state of the dust collector according to the present invention.

First, in the drawings, the same or similar elements are denoted by the same reference numerals even when they are depicted in different drawings. In the following description of the present invention, a detailed description of known functions and configurations incorporated herein will be omitted when it may make the subject matter of the present invention rather unclear.

A dust collector 100 for air conditioners according to one embodiment of the present invention includes a circular rim part 110, frames 130 configured to extend from the rim part 110 so as to install a motor 160 thereon, a dust collection net 120 attached to the frames 130, a brush 170 configured to be in close contact with the dust collection net 120 and to be rotated by the motor 160, an opening 140 formed at the lower end of the rim part 110 so as to discharge dust therethrough, an open part 121 formed at one side of the dust collection net 120, and a concave groove part 131 having the outside coupled to the open part 121 and one side communicating with the opening 140 of the rim part 110.

Here, the shape of the dust collection net 120 in the present invention may be a disc shape, and the reason for this is that the brush 170 must be rotated by the motor 160 so as to wipe off dust from one side surface of the dust collection net 120.

The upper end of the concave groove part 131 may be located under a motor shaft 161, and the lower end thereof may be located over the opening 140. The reason for this is that, when the brush 170 is rotated, the brush 170 in an upright state may be most capable of easily wiping off dust.

A plurality of frames 130 extends from the rim part 110, and is necessary to allow the motor 160 to be stably coupled thereto and to support the dust collection net 120.

A through hole 131a, through which the motor shaft 161 passes, is formed through the center among the frames 130.

The motor shaft 161 passing through the through hole 131a passes through the center of the dust collection net 120, and is coupled to the brush 170 rotated in the state in which the brush 170 is in close contact with the dust collection net 120.

A dust removal unit, which may remove dust from one side surface of the dust collection net 120 without damaging the dust collection net 120, may be formed at one end of the brush 170, and the dust removal unit may be formed of mohair, a soft resin plate, a rubber plate, or the like.

A coupling unit which couples the dust collector to one side of an external air inlet of an air conditioner (not shown) may be provided at the rim part 110, and when a screw is used as the coupling unit provided at the rim part 110, a screw hole, into which the screw is inserted may be formed, when a circular connector protrudes from the inside of the external air inlet, the rim part 110 may be coupled to the connector by interference fit, or the rim part 110 may be coupled to the external air inlet by engagement using known coupling and latch units, or the rim part 110 may be coupled to the external air inlet by screw combination using spiral threads formed therein. In addition, it is apparent that various other well-known coupling units may be used.

The concave groove part 131 coupled to the open part 121 of the dust collection net 120 serves to facilitate discharge of dust when the dust filtered out on one surface of the dust collection net 120 is swept by the brush 170, and a dust outlet 150 may be formed at the lower end of the opening 140 so as to discharge the collected dust to the outside of the air conditioner via a dust discharge pipe A.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

[Description of Reference Numerals and Marks]

100: dust collector for air conditioners
110: rim part
120: dust collection net
130: frame
140: opening
160: motor
A: dust discharge pipe 121: open part
131: concave groove part
150: dust outlet
170: brush

The invention claimed is:

1. A filter structure capable of removing dust, comprising a circular rim part, frames configured to extend from the circular rim part so as to install a motor thereon, a dust collection net attached to the frames, a brush configured to be in close contact with the dust collection net and to be rotated by the motor, and an opening formed at a lower end of the circular rim part so as to discharge dust therethrough, wherein:

an open part is formed at one side of the dust collection net;

a concave groove part, which communicates with the opening formed at the lower end of the circular rim part, is formed on one of the frames; and the concave groove part penetrates the dust collection net through the open part of the dust collection net so that dust swept by the brush is naturally discharged to the opening through the concave groove part.

2. The filter structure according to claim 1, wherein an upper end of the concave groove part is located under a motor shaft, and a lower end of the concave groove part is located over the opening.

\* \* \* \* \*